United States Patent [19]

Montag

[11] 4,250,249

[45] Feb. 10, 1981

[54] METHOD FOR DEVELOPING RESIDUAL-MOISTURE PHOTOGRAPHS

[75] Inventor: Bernhard Montag, Kersbach, Fed. Rep. of Germany

[73] Assignee: Siemens Aktiengesellschaft, Munich, Fed. Rep. of Germany

[21] Appl. No.: 936,948

[22] Filed: Aug. 25, 1978

[30] Foreign Application Priority Data

Sep. 14, 1977 [DE] Fed. Rep. of Germany ....... 2741405

[51] Int. Cl.³ .......................... G03C 5/30; G01M 9/00

[52] U.S. Cl. .................................... 430/355; 430/422; 430/423; 430/425; 430/441; 73/147

[58] Field of Search ............ 73/147; 96/50 R, 50 PT, 96/65; 430/422, 355, 423, 424, 441, 425, 426

[56] References Cited

U.S. PATENT DOCUMENTS

| | | | |
|---|---|---|---|
| 1,417,791 | 5/1922 | Bagley | 96/50 R |
| 3,694,209 | 9/1972 | Schwienbacher | 96/50 |
| 3,774,225 | 11/1973 | Kimmel et al. | 73/147 |
| 3,787,874 | 1/1974 | Urban | 73/147 |
| 3,890,835 | 6/1975 | Dötzer | 73/147 |

OTHER PUBLICATIONS

Engineering News-Record, Nov. 12, 1936, p. 684, "Flow Turbulence Analyzed by Means of Photography".

Clerc; Photography: Theory and Practice, 2nd Ed. 1937, p. 250.

*Primary Examiner*—Mary F. Downey

*Attorney, Agent, or Firm*—Kenyon & Kenyon

[57] ABSTRACT

For developing residual-moisture photographs according to the wet-film technique, a pre-treatment with a first solution of about 5% ethanolic NaOH is performed first at about 13° C. After the alkali exchange, the exposed film passes through a bath at a bath temperature of 50° C. with a hydroquinone-containing photographic developer. This "Two-bath wet developing method" takes place in daylight. The developed, fixed, rinsed and dried film can be evaluated directly.

6 Claims, 1 Drawing Figure

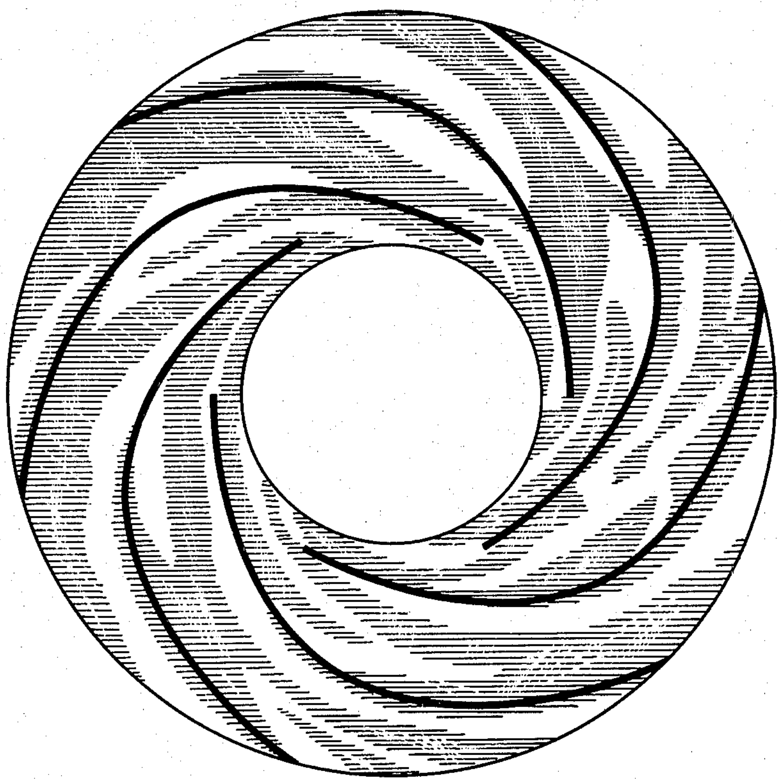

METHOD FOR DEVELOPING RESIDUAL-MOISTURE PHOTOGRAPHS

BACKGROUND OF THE INVENTION

It is known to use residual-moisture photographs (wet-film technique) for making visible and recording steady-state boundary layer flow in gases and liquids, using photographic film (German Pat. No. 2,133,834).

This photographic method is based on the evaporation of a liquid from a photographic gelatin film in an air stream. The rate of evaporation is determined by the local layer thickness of Prandtl's boundary layer.

A commercial photographic film is swelled with water and exposed in the flow channel. The moisture distribution remaining in the photographic gelatin layer after it is surface dried by conducting an inert gas over it, i.e., the residual moisture profile, is transformed, by conducting a photochemically reactive gas such as hydrogen sulfide gas over it, into a latent image which can be developed photographically and is converted by a photographic developer into a moisture-analog halftone photograph.

Besides the foregoing "sulfide seeding method", in which the drying profile is made visible by hydrogen sulfide gas, the drying profile can also be made visible by post-exposure, generating a moisture-analog silver half-tone profile upon post-exposure from the photographic developer absorbed in the residual-moisture profile.

The practical application of this method, which usually works with concentrated $H_2S$ gas, is often difficult. Dark room conditions and a closed hood are required. As the contrast range of the photographs is relatively small, an evaluation cannot be made directly from the original by means of equidensity images but only via an intermediate copy.

SUMMARY OF THE INVENTION

It is accordingly an object of the invention to develop residual-moisture photographs which are easy to evaluate, while avoiding working with gases injurious to health, especially with hydrogen sulfide gas.

According to the invention, this problem is solved by immersing the residual-moisture profile of a film swelled in water (generated by a flow of gas against it) into 5% ethanolic sodium hydroxide (Solution I) of about 10 to 16° C. and subsequently passing the exposed film pass through a rolling device charged with a hydroquinone-containing photographic developer solution (Solution II) at 50° C. (bath temperature). Subsequently, the developed film is, as customary, fixed, rinsed and dried. The film can then be evaluated directly. It is a particular advantage that the wet development takes place in daylight, that the process is visible and can be followed in daylight, that the reproducibility is better with less apparatus and the processing time per film is extremely short, about 1.5 minutes. The film obtained with the method according to the invention, the "two-bath wet development method", can be evaluated directly.

DETAILED DESCRIPTION OF THE INVENTION

To carry out the method according to the invention, the film which is pre-exposed diffusely in daylight and has been exposed in the flow channel, is first immersed horizontally into the 5% ethonolic NaOH (Solution I) of preferably 13° C.; particularly favorable results were obtained with an immersion time of 25 seconds. During the immersion of the film in Solution I, alkali ions pass from the solution into the film layer proportional to the existing residual moisture.

After the film is removed from Solution I, the moisture still remaining on the surface of the film is removed, preferably by using a calender; the wet film layer is brought to a state of dryness optimum for the method by adjusting the distance of the rolls.

The film is now made to pass through a rolling device which contains Solution II, a commercial hydroquinone-containing or resorcinol-containing photographic developer. The operating temperature of this solution is rather exactly 50° C. During this pass of the film, a visible black-and-white silver half-tone image now develops proportional to the alkali distribution present in the film and thereby also proportional to the residual moisture.

The FIGURE shows a positive copy of a flow pattern in a blower wheel obtained in accordance with the invention. The photographic density of the silver halftone photograph is a direct measure for the steady-state boundary layer distribution.

By the method according to the invention, the steady-state boundary layer flow processes of gases, especially air, can be determined in aerodynamic equipment.

What is claimed is:

1. A method for developing residual-moisture photographs according to the wet-film technique, comprising:
   (a) flowing a gas against a photographic film which has been swelled in water and exposed thereby generating a residual-moisture profile on the photographic film;
   (b) contacting said film on which said residual-moisture profile has been generated with a 5% ethanolic sodium hydroxide solution having a temperature of about 10 to 16° C.;
   (c) thereafter contacting said film with a photographic developer solution having a temperature of about 50° C.; and
   (d) further processing said film to fix, rinse and dry the photographic half-tone image obtained upon development.

2. The method according to claim 1 wherein said photographic developer solution contains hydroquinone.

3. The method according to claim 2 wherein said film is immersed horizontally in said 5% ethanolic sodium hydroxide solution for about 25 seconds.

4. The method of claim 1 wherein residual moisture profile is that of the steady-state boundary layer flow of a gas in aerodynamic equipment.

5. The method of claim 1 wherein said contacting of said film with a photographic developer comprises passing said film through a rolling device charged with said developer solution.

6. The method of claim 1 wherein said film of step (b) is treated to remove surface moisture therefrom before the contacting of step (c).

* * * * *